UNITED STATES PATENT OFFICE 2,524,096

PROCESS FOR PREPARING BETA-PHENYL ETHYL ALCOHOL

Thomas F. Wood, Clifton, N. J., assignor to Burton T. Bush, Inc., New York, N. Y., a corporation of New Jersey No Drawing. Application December 23, 1948, Serial No. 67,079

7 Claims. (Cl. 260—618)

This invention relates to a novel process for the preparation of beta-phenyl ethyl alcohol from styrene oxide and more especially to the hydrogenation of styrene oxide in the presence of hydrogenation catalysts effective at comparatively low temperatures and pressures.

Known methods for preparing beta-phenyl ethyl alcohol usually employ substances such as corrosive aluminum chloride or expensive Grignard reagents. It has also been proposed to hydrogenate styrene oxide in the vapor phase by using a catalyst such as reduced nickel. While such a process has the advantage of not employing corrosive materials such as aluminum chloride or expensive reagents such as the Grignard reagent the process nevertheless is unsatisfactory for the reason that the yield of beta-phenyl ethyl alcohol is too low to make the process commercially feasible, and a considerable amount of ethyl benzene is produced. Furthermore, considerable amounts of unreacted styrene oxide as well as polymerization products are obtained by such a process.

In accordance with this invention I have found a commercially feasible process for making beta-phenyl ethyl alcohol in high yields and a technically-simple manner by employing styrene oxide in liquid phase and hydrogenating it in the presence of certain catalysts at comparatively low temperatures. Temperatures as low as 20° C. below zero may be used and, if desired, the temperature employed may vary up to about 100° C. I have found that advantageous results are obtained by operating within a temperature range of about 0° C. to about 50° C.

As aforementioned, catalysts which are effective in my process are those which are active as hydrogenating catalysts at comparatively low temperatures and pressures. Hydrogenating catalysts which are effective only at higher temperatures, i. e., at temperatures above 100° C., such as copper or copper chromite, are not satisfactory for the purposes of my invention. As examples of catalysts suitable for use herein I mention Raney nickel, platinum (on activated charcoal), palladium catalysts and platinum oxide (Adams). Whenever the term "low temperature hydrogenating catalyst" or its equivalent is employed in the description or claims herein it is understood to refer to hydrogenating catalysts effective as such at temperatures within the range from about −20° C. to 100° C.

In general, my process can be conducted by introducing styrene oxide and the catalyst into an autoclave. If desired, a solvent may be present, polar solvents such as methyl alcohol and ethyl alcohol giving especially satisfactory results. Hydrogen gas is then introduced, preferably after first evacuating the autoclave. While my process is operative at atmospheric pressure, it is preferred to employ super-atmospheric pressure with certain catalysts such as Raney nickel in order to accelerate the rate of reaction. After enough hydrogen gas has been introduced to give the desired pressure, heat and agitation are applied, the amount of heat being governed by the temperature at which the absorption of hydrogen is desired. If the reaction is conducted at sub-room temperatures, cooling means are employed in order to attain the desired temperature.

From time to time additional hydrogen gas is introduced to maintain the desired pressure. When there is no longer any drop in hydrogen pressure the contents are cooled and removed from the autoclave. After filtration to remove the catalyst, the reaction product is distilled and the desired beta-phenyl ethyl alcohol is obtained.

The amounts of styrene oxide, hydrogen and catalyst employed in the process of this invention may vary considerably. Stoichemetric amounts of styrene oxide and hydrogen gas, as called for by the following chemical equation give excellent results:

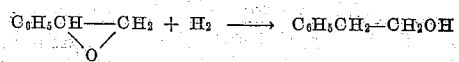

Styrene oxide   Hydrogen   Beta-phenyl ethyl alcohol

I have found it advantageous to employ an excess of hydrogen gas, 1.1 mols of the latter to 1 mol of styrene oxide giving especially desirable results.

On the basis of the styrene oxide employed, the catalyst may be used in amounts from about 0.5 to about 4 per cent by weight, but, if desired, amounts greater or smaller than those given may also be used with satisfactory results.

The temperatures and pressures which may be employed in accordance with my invention may vary widely. They depend, among other things, upon the catalyst and solvent, if any, employed. Superatmospheric pressures up to about 500 pounds per square inch give excellent results in accordance with my process when conducted for periods from three to six hours.

In order more fully to describe my process the following examples are given, it being understood that these examples are for purposes of illustration and not limitations.

Example 1

The following materials were charged into a stainless steel insert of 700 cc. capacity adapted for use in a standard rocking type autoclave of 3000 cc. capacity (American Instrument Co.):

180 grams of styrene oxide (1.5 mols)
3 grams of soda ash
6 grams of Raney nickel The insert was placed in the autoclave and anchored therein. The air was removed from the system under a high vacuum and hydrogen gas was introduced until a pressure of 200 pounds per square inch was attained. The unit was then electrically heated and agitation was begun. The temperature was brought to 50° C. and maintained thereat for five hours, during which time hydrogen gas was occasionally introduced in order to maintain the pressure between 150 and 200 pounds per square inch.

After five hours at 50° C. there was no longer any drop in pressure and the contents were cooled and pressure released. The reaction product was removed from the insert, filtered and distilled. There was obtained 134 grams of beta-phenyl ethyl alcohol having the following properties:

Specific gravity 25° C./25° C _____ 1.0195
Refractive index (20° C.) _____ 1.5320
Boiling point _____ 91–93° C. at 5 mm. Hg.
Purity _____ 98.1% by acetylation.

No phenyl methyl carbinol was obtained.

Example 2

Employing the apparatus described in Example 1, the following were charged into the insert:

240 grams of styrene oxide (2 mols)
240 grams of methyl alcohol
2 grams of soda ash
6 grams of Raney nickel catalyst The charge was treated as in Example 1 except that the pressure here employed was 500 pounds per square inch and the time of treatment here was six hours.

After cooling and filtering the reaction product, the methyl alcohol was distilled off the filtrate and the remaining liquid was distilled under vacuum. There was obtained 190 grams of the desired beta-phenyl ethyl alcohol having substantially the same properties as that obtained in Example 1.

Example 3

Into a one gallon steel autoclave provided with a mechanical agitator was charged:

600 grams of styrene oxide (Dow)
1,200 grams of methyl alcohol
12.5 grams of soda ash ($Na_2CO_3$)
15.0 grams of Raney nickel catalyst After the autoclave was evacuated, hydrogen was introduced to a pressure of 50 pounds per square inch. The agitator was started and hydrogen absorption immediately began. The hydrogenation was completed in five hours at 30° C. using a hydrogen pressure of 25 to 50 pounds per square inch. The reaction was exothermic and a small flow of cooling water was applied to the autoclave jacket to maintain the temperature at 30° C. The catalyst was filtered off, the methyl alcohol was distilled off at atmospheric pressure and the product was vacuum-distilled.

There was obtained 534 grams of beta-phenyl ethyl alcohol.

Example 4

Into a rocking autoclave provided with a glass liner was charged:

120 grams of styrene oxide (1 mol)
120 grams of methyl alcohol
4 grams of soda ash ($Na_2CO_3$)
2 grams of platinum on activated charcoal (5%) catalyst (Baker & Co., Inc., Newark, N. J.)

Under a hydrogen pressure of 100 to 40 pounds per square inch the absorption of hydrogen was fairly rapid. The hydrogenation was completed in two hours during which time the temperature rose from 27° C. to 37° C. After filtration to remove the catalyst, the methyl alcohol was distilled off and the product was vacuum-distilled. There was obtained 110 grams of beta-phenyl ethyl alcohol having the following properties:

Boiling point _____ 74–77° C. at 2.5 mm.
Specific gravity 25° C./25° C _____ 1.0200
Refractive index (20° C.) ___ 1.5308

Example 5

Into a rocking autoclave provided with a glass liner was charged:

120 grams of styrene oxide (1 mol)
120 grams of methyl alcohol
4 grams of soda ash ($Na_2CO_3$)
2 grams of palladium on charcoal (5%) catalyst (Baker & Co., Inc., Newark, N. J.)

When hydrogen was introduced to a pressure of 30 to 100 pounds per square inch, there occurred good absorption and the hydrogenation was completed in two hours during which time the temperature rose from 28° C. to 36° C. After removal of the catalyst and solvent the product was vacuum-distilled. There was obtained 104 grams of beta-phenyl ethyl alcohol having the following properties:

Boiling point _____ 86–88° C. at 4 mm.
Specific gravity 25° C./25° C _ 1.0202
Refractive index (20° C.) ___ 1.5310

Example 6

Into a one gallon, brine-cooled, stainless steel autoclave provided with a good agitator was charged:

800 grams of styrene oxide (Dow)
1,600 grams of methyl alcohol
8 grams of soda ash
37 grams of Raney nickel catalyst The mixture was cooled to −5° C. and the autoclave evacuated. Hydrogen was introduced to a pressure of 100 pounds per square inch. Stirring was begun. Hydrogen absorption was very slow. The hydrogenation was run for seventy-two hours (three days) while the temperature was maintained at 0° C. to −4° C. by brine-cooling and the hydrogen pressure at 100 pounds per square inch. It was impossible to tell just when absorption of hydrogen ceased, owing to a slight leak around the packing gland of the stirrer of the autoclave. The charge was removed and filtered to remove the catalyst. The methyl alcohol was distilled off at atmospheric pressure and the product vacuum-distilled. There was obtained 723 grams of pure beta-phenyl ethyl alcohol having the following properties:

Boiling point _____ 73° C. at 2 mm.
Yield of theory _____ 89%

Example 7

Into a one-gallon, brine-cooled, stainless steel autoclave was charged:

400 grams of styrene oxide (Dow)
1,200 grams of methyl alcohol
4 grams of soda ash
20 grams of Raney nickel catalyst Full brine-cooling was applied to the autoclave jacket and the temperature fell to a minimum of −20° C. The autoclave was evacuated and then charged with hydrogen to a pressure of 100 pounds per square inch. The autoclave was allowed to run for forty-eight hours with full brine-cooling while the hydrogen pressure was maintained at 100 pounds per square inch. The temperature at the end of the hydrogenation was −19° C. The product was worked up as in the preceding experiment. There was obtained 365 grams of beta-phenyl ethyl alcohol. The yield was 90 per cent of theory.

The foregoing illustrates my invention, which, however, is not to be limited thereby but is to be construed as broadly as permissible in view of the prior art and limited solely by the appended claims.

I claim:

1. A process for preparing beta-phenyl ethyl alcohol, which comprises treating one mol of styrene oxide with about 1.1 mols of hydrogen gas in the presence of Raney nickel at temperatures within the range of about −20° C. to about 100° C. and under a superatmospheric pressure up to about 500 pounds per square inch.

2. A process for preparing beta-phenyl ethyl alcohol, which comprises treating styrene oxide with hydrogen gas in the presence of Raney nickel at temperatures within the range of about 0° C. to about 50° C. and under a superatmospheric pressure up to about 500 pounds per square inch.

3. A process for preparing beta-phenyl ethyl alcohol, which comprises treating styrene oxide with hydrogen gas in the presence of Raney nickel at temperatures within the range of about 0° C. to about 50° C.

4. A process for preparing beta-phenyl ethyl alcohol, which comprises treating styrene oxide with hydrogen gas in the presence of Raney nickel at a temperature not in excess of 100° C.

5. A process for preparing beta-phenyl ethyl alcohol, which comprises treating styrene oxide with hydrogen gas in the presence of a nickel catalyst at a temperature not in excess of 100° C.

6. A process for preparing beta-phenyl ethyl alcohol, which comprises treating styrene oxide with hydrogen gas in the presence of a low temperature hydrogenation catalyst at a temperature not in excess of 100° C.

7. A process for preparing beta-phenyl ethyl alcohol, which comprises treating styrene oxide with hydrogen gas in the presence of a low temperature hydrogenation catalyst.

THOMAS F. WOOD.

No references cited.

Certificate of Correction

Patent No. 2,524,096　　　　　　　　　　　　　　　　October 3, 1950

THOMAS F. WOOD

It is hereby certified that the above numbered patent was erroneously issued to "Burton T. Bush, Inc., of New York, N. Y., a corporation of New Jersey", whereas said patent should have issued to *The Givaudan Corporation, a corporation of New Jersey*, as assignee of the entire interest therein, and that the said Letters Patent should be read as corrected above, so that the same may conform to the record of the case in the Patent Office.

Signed and sealed this 30th day of January, A. D. 1951.

[SEAL]

THOMAS F. MURPHY,
*Assistant Commissioner of Patents.*